UNITED STATES PATENT OFFICE.

ROBERT SCHMIDLIN, OF HÖCHST-ON-THE-MAIN, GERMANY, ASSIGNOR TO FARBWERKE, VORM. MEISTER, LUCIUS & BRÜNING, OF HÖCHST-ON-THE-MAIN, GERMANY, A CORPORATION OF GERMANY.

PROCESS OF MAKING PHENYLGLYCIN.

No. 841,456.     Specification of Letters Patent.     Patented Jan. 15, 1907.

Application filed May 23, 1906. Serial No. 318,296.

*To all whom it may concern:*

Be it known that I, ROBERT SCHMIDLIN, chemist, a citizen of the Swiss Republic, residing at Höchst-on-the-Main, Germany, have invented certain new and useful Improvements in the Process of Making Phenylglycin, of which the following is a specification.

Numerous processes have of late been devised for an improved manufacture of phenylglycin from anilin as the parent material.

I have found that phenylglycin may be obtained directly from nitrobenzene by treating it with chloracetic acid and iron

That such a process would give rise to a satisfactory yield of phenylglycin could not be anticipated in view of the absence of smoothness in the simple reaction between anilin and chloracetic acid and of the activity with which the reduction of nitrobenzene by iron proceeds, this last fact rendering it probable that the chloracetic acid could be reduced to acetic acid.

It is possible that the unexpectedly good result may be due to the insolubility of the compound of iron with phenylglycin, which might protect the product from further reaction.

The invention consists in heating nitrobenzene or a homologue thereof with iron and chloracetic acid and may be illustrated as follows:

Into a vessel provided with an agitator, reflux condenser, and thermometer are introduced six hundred and twenty kilos of nitrobenzene, one thousand kilos of ground or otherwise subdivided cast-iron, and seventy kilos of anilin. The whole is heated to about 70° centigrade, whereupon a solution of four hundred and seventy kilos of monochloracetic acid in about one thousand liters of water is gradually run in. The temperature of this chloracetic-acid solution, which is at first about 50° centigrade, is gradually raised to 90° centigrade. The chloracetic-acid solution is introduced in such a manner that the mass may remain constantly boiling. The heating is continued for another couple of hours at from 98° to 100° centigrade, and the mass is then neutralized with a concentrated solution of sodium carbonate, for which purpose about six hundred kilos of calcined soda are needed. The mass is then distilled with steam. About seventy kilos of anilin pass over and are used in a fresh operation. The mixture is then passed through a filter-press, and the residue is thoroughly washed with water. From the combined filtrate and washings, reduced to about three thousand liters, the phenylglycin is separated by adding the requisite quantity of a mineral acid.

The directions given above are solely for the purpose of illustrating the process. The proportions and other details may be varied.

If in the foregoing example for the nitrobenzene be substituted an equivalent quantity of ortho-meta- or para-nitrotoluene, the known tolylglycins are obtained.

Having now described my invention, what I claim is—

The herein-described process for making aromatic phenylglycins, which consists in causing chloracetic acid to act in the heat on aromatic nitrohydrocarbons in presence of iron, transforming the iron-glycinate thus obtained into alkali glycinate by means of alkalies, distilling off the excess of aromatic amin with steam and precipitating the glycin with dilute acids from the residue filtered from the iron oxid.

In testimony that I claim the foregoing as my invention I have signed my name in presence of two subscribing witnesses.

ROBERT SCHMIDLIN.

Witnesses:
   JEAN GRUND,
   CARL GRUND.